UNITED STATES PATENT OFFICE.

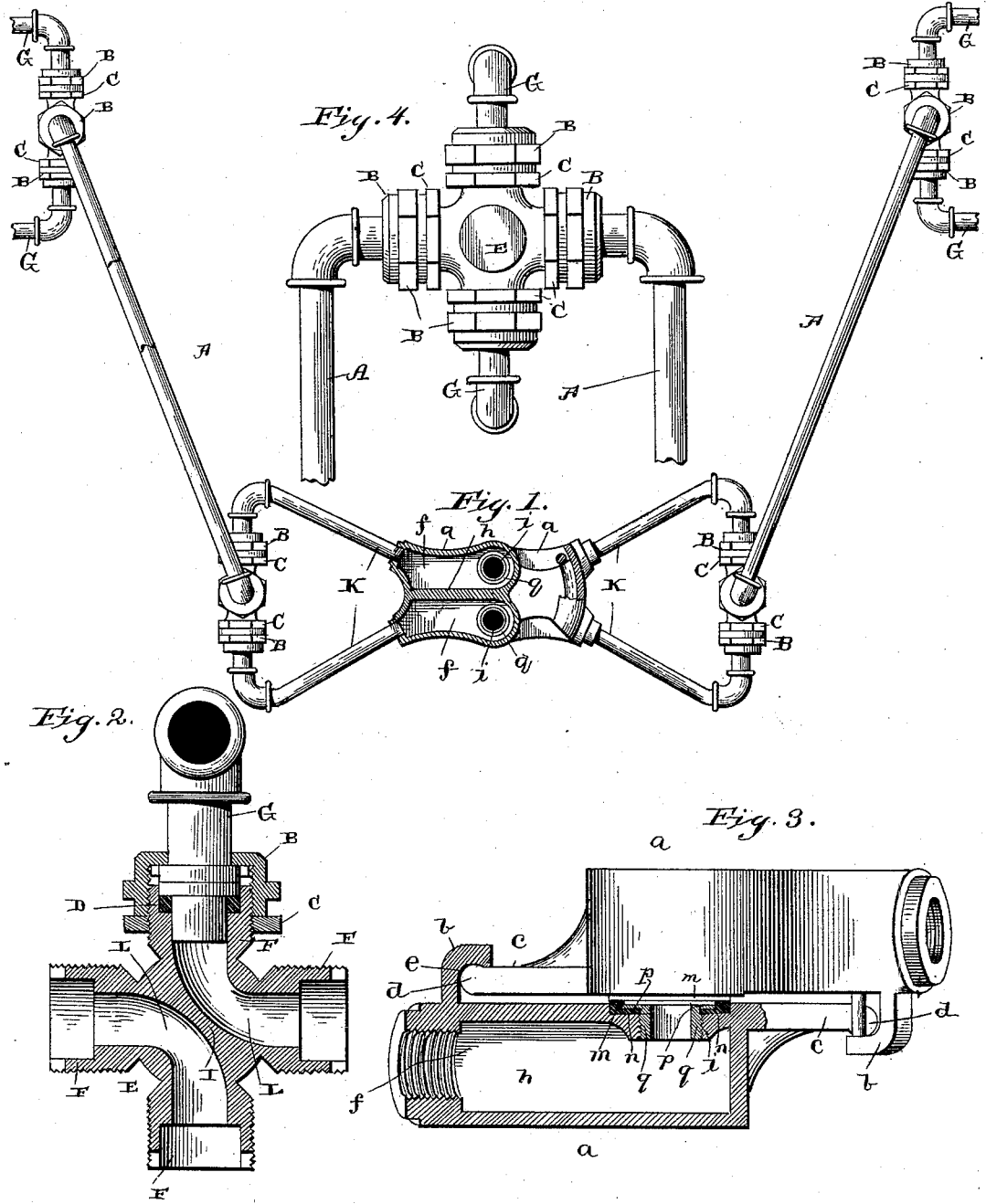

JOSEPH BLATTNER, OF ALLEGHENY, PENNSYLVANIA.

AIR AND STEAM COUPLING.

SPECIFICATION forming part of Letters Patent No. 474,207, dated May 3, 1892.

Application filed February 11, 1892. Serial No. 421,159. (No model.)

*To all whom it may concern:*

Be it known that I, JOSEPH BLATTNER, of Allegheny, in the county of Allegheny and State of Pennsylvania, have invented certain new and useful Improvements in Air, Steam, and other Similar Couplings; and I do hereby declare the following to be a full, clear, and exact description of the invention, such as will enable others skilled in the art to which it pertains to make and use it, reference being had to the accompanying drawings, which form part of this specification.

My invention relates to improvements in air, steam, and other similar couplings, which is intended as an improvement upon a patent granted to me August 4, 1891, No. 457,246; and it consists in certain features of construction, and arrangement and combination of parts, which will be fully described hereinafter, and particularly pointed out in the claims.

The object of my invention is to provide a coupling for steam, air, or other similar purposes, which is composed of two pipes united in the form of frames, with joints which connect the frames together and to a car or vessel universally, and to have one set of the pipes for air and the other for steam, and to connect the frames by a single automatically-separating coupling.

In the accompanying drawings, Figure 1 is a side elevation of a coupling which embodies my invention, one member of the coupling proper being shown in vertical longitudinal section. Fig. 2 is a vertical longitudinal section of the ends of the rectangular frames. Fig. 3 is a top view of the two members of the coupling proper, one of the members being shown in horizontal section. Fig. 4 is an end view of the upper end of the frames.

A indicates two rectangular frames, which are composed like those shown, described, and claimed in the aforesaid Letters Patent, whereby they are allowed a universal movement, as therein shown and described, and for the purpose therein specified. These frames and the joints which connect the members thereof are substantially the same as that shown in the said patent and do not need any elaborate or particular description here. I have made a slight change in the joints, which is shown in Fig. 2, which consists in providing for the nuts B, in which the ends of the sections or pipes which compose the frame and which connect the frame to the cars are swiveled, a lock nut or nipple C, which is placed inside of the nut upon the screw-threaded flange D, as shown. In this manner after the nuts have been screwed down to their place to properly hold the swiveled sections in place, the nipple is turned outward against the inner edge of the nut, which clamps it securely and prevents it from becoming unscrewed, as will be understood.

This invention or improvement differs radically from that shown in my patent, in that I pass through one of the pipes or sections which compose the frames steam, while I pass through the other pipe of the frames air, and then convey the air and steam from their respective pipes through separate and individual pipes under the cars, so that steam can be used in one for operating the brakes, and air in the other for an air-whistle or signal to the engineer; or, if preferred, air can be passed through them both, one being used for the brake and the other for the signal. I do not limit myself as to what the pipes shall be used to convey, for they can both be made to convey steam, one for the brakes and one to operate a steam-signal, or one for the brakes and the other for heating purposes, as may be found most convenient. The main object is to have the two side pipes or sections of which the rectangular frames are composed separate and distinct, to be used for different purposes. This result is accomplished by the peculiar shape of the end pieces, which connect the side pieces of the frames. These end pieces E are composed of a casting having four screw-threaded flanges F, which receive the nuts B and the nipples C. To the two side or horizontal screw-threaded flanges the side pipes of the frames are swiveled in the manner shown in my said patent or in any other convenient manner to allow the casting E to have a turning movement thereon, as will be understood. To the two vertical flanges F the two pipes G have their outer ends swiveled, and the opposite ends of these pipes are connected to the cars or vessel to which they are attached. Thus it will be seen that the ends of the side sections or pipes of the frames A are composed of a cross. These castings are provided with the diagonal wall I, which makes the passages L, that connect, respectively, one of the horizontal passages with one of the vertical passages that connects with one of the pipes G and the other vertical passage with the other pipe G. In this manner it will be seen that one of the side pipes of the frame A is connected with one of the pipes G that extend under the car and the other side pipe of the same frame with the other pipe G that extends under the car. By means of this construction it will be seen that I have two separate passages formed through the frames. The lower ends of the side pieces of the frame are connected by castings similar to the casting just described, which connects the upper ends of the side pieces, thus completing two separate passages at that end of the frames. These separate passages are connected, respectively, with the inner ends of the two pipes K, which are swiveled to swing horizontally.

In my patent herein referred to I show a coupling which is rigid when coupled and which cannot be separated except by turning it. This I find to be objectionable, for the reason that if the cars accidentally separate the coupling will be torn and injured by the separation of the cars. To avoid this, I provide a coupling, which consists of two members $a$, each of which is provided at the inner end of one side with a laterally-projecting L-shaped flange $b$, under which a projecting lip $c$ of the adjoining member catches. This lip $c$ is provided with a slight bead or projection $d$ at its inner end, which catches in a similar groove $e$, made in the under side of the projecting portion of the L-shaped flange $b$, so that the two members are united by giving them a turning movement. The inner ends of the pipes K are screwed into the outer ends of the two members, as shown, and communicate with a chamber formed in the members. This chamber is divided into two chambers $f$ by means of a longitudinal wall $h$, and with one of these chambers one of the pipes K is connected, the other pipe being connected with the other chamber. Two openings $i$ are made in the inner ends of the members $a$ at their inner sides, which communicate, respectively, with the two chambers $f$ and register with the same openings of the other member. In this manner it will be seen that two separate passages are formed through the frames A and the members which form the coupling proper. In order to make a tight joint between these members $a$, I provide a packing $m$ for the openings $i$, which fit in annular recesses $n$. These packings are held in place by means of clamping-rings $p$, which are provided with screw-threaded flanges $q$, that screw into the openings $i$. In this manner the packings are held firmly in place and make a tight joint. Another office of these packings is to allow the members of the coupling to automatically detach should the cars accidentally part for any reason. This is accomplished by the packings yielding sufficiently to allow the beads or projections $d$ to slip out of the grooves $e$ when a pull is exerted upon them, as will be readily seen. This automatic detachment of the members prevents the couplings from being injured in any manner.

From the above description it will be seen that I provide a coupling formed wholly of metal which is universal in its movements for the purpose set forth in my patent herein referred, and which makes two separate and distinct passages through the entire coupling, and to use a single coupling composed of only two members to complete the passages, and which will automatically separate when the cars to which they are attached are parted.

Having thus described my invention, what I claim, and desire to secure by Letters Patent, is—

1. A coupling composed of rectangular frames consisting of side pieces, end castings or pieces having two horizontal and two vertical passages, the side pieces being swiveled to the horizontal passages, and pipes swiveled to the vertical passages, the pipes at the upper ends of the frame being connected with a car, and the pipes at the lower ends of the frames being connected to a coupling, a coupling composed of two members having each two passages with which the said pipes are respectively connected, and openings at the inner sides of the members which register and extend into the said passages, the members being adapted to interlock, substantially as specified.

2. A coupling composed of two rectangular frames consisting each of side pipes and end castings having, respectively, two horizontal and two vertical passages, the inner ends of these passages being separated by means of a diagonal wall, the ends of the side pipes being swiveled to the outer ends of the horizontal passages, the vertical passages of the casting at the upper ends of the frames being connected with pipes that are connected with the cars, and a coupling for the inner ends of the frames, consisting of two members which interlock, each member having two longitudinal chambers, pipes which have one end connected, respectively, with the said passages and their other ends connected with the vertical passages of the casting at the lower ends of the frames, the members having openings in the inner sides of their inner ends which register and which communicate, respectively, with the said chambers, all combined substantially as and for the purpose set forth.

3. A coupling composed of rectangular hollow frames having side pieces and end pieces, two pipes which extend under the car, the said end pieces provided with two separate passages, the said side pieces of the frames being respectively swiveled with one end of each of the passages, and the said car-pipes swiveled, respectively, with the opposite end of each of the said passages, and a coupling for the pipes at the lower ends of the frames, composed of two members having each two passages which register, respectively, and with which the said pipes at the lower ends of the frames respectively connect.

In testimony whereof I affix my signature in presence of two witnesses.

JOSEPH BLATTNER.

Witnesses:
ALLEN S. PATTISON,
ROLAND A. FITZGERALD.